US007010324B2

(12) United States Patent
Ho et al.

(10) Patent No.: US 7,010,324 B2
(45) Date of Patent: Mar. 7, 2006

(54) MOBILE COMMUNICATION APPARATUS WITH FUNCTION FOR AUTOMATICALLY REMOVING STROBE AND METHOD THEREOF

(75) Inventors: David Ho, Taipei (TW); Tony Tsai, Taipei (TW); Cheng Chang, Shanghai (CN)

(73) Assignee: Inventec Appliances Corp., Taipei (TW)

( * ) Notice: Subject to any disclaimer, the term of this patent is extended or adjusted under 35 U.S.C. 154(b) by 56 days.

(21) Appl. No.: 10/709,851

(22) Filed: Jun. 2, 2004

(65) Prior Publication Data

US 2005/0136974 A1 Jun. 23, 2005

(51) Int. Cl.
 *H04M 1/00* (2006.01)

(52) U.S. Cl. ............................... 455/556.1; 455/414.2; 348/226.1; 348/227.1

(58) Field of Classification Search ............. 455/556.1, 455/414.2, 550.1, 456.1, 456.2, 456.6, 432.1; 348/223.1, 226.1, 227.1
See application file for complete search history.

(56) References Cited

U.S. PATENT DOCUMENTS

| | | | | |
|---|---|---|---|---|
| 4,669,840 A | * | 6/1987 | Samuelson | 352/170 |
| 6,424,843 B1 | * | 7/2002 | Reitmaa et al. | 455/566 |
| 6,748,223 B1 | * | 6/2004 | Fraccaroli | 455/456.1 |
| 2001/0007470 A1 | * | 7/2001 | Haavisto | 348/223 |
| 2002/0008849 A1 | * | 1/2002 | O'Hagan | 352/49 |
| 2004/0179114 A1 | * | 9/2004 | Silsby et al. | 348/226.1 |
| 2004/0201729 A1 | * | 10/2004 | Poplin et al. | 348/226.1 |
| 2005/0128317 A1 | * | 6/2005 | Suzuki | 348/223.1 |

* cited by examiner

*Primary Examiner*—Sonny Trinh
(74) *Attorney, Agent, or Firm*—Jiang Chyun IP Office

(57) ABSTRACT

A method for automatically removing strobe in a digital image capturer of a mobile communication apparatus and a mobile communication apparatus thereof are provided. The method comprises: providing a local area data by the mobile communication apparatus, the local area data indicating an area the mobile communication apparatus is located; generating a power frequency data corresponding to the local area data; and setting the digital image capturer based on the power frequency data to remove the strobe. The method may further includes the mobile communication apparatus detecting/communicating a telecommunication service network, the telecommunication service network providing a mobile communication service; and the telecommunication service network sending the local area data to the mobile communication apparatus.

15 Claims, 1 Drawing Sheet

MOBILE COMMUNICATION APPARATUS WITH FUNCTION FOR AUTOMATICALLY REMOVING STROBE AND METHOD THEREOF

BACKGROUND OF INVENTION

1. Field of the Invention

This invention generally relates to a method for automatically removing strobe for a digital image capture device, and more particularly to a method for automatically removing strobe for a digital image capturer embedded in a mobile communication apparatus and an apparatus thereof.

2. Description of Related Art

Digital image capturer plays an indispensable role in the modern era. Not only it can used to record activities of our daily life, it also can collect evidence. A digital camera is a classic example of a digital image capturer.

Another important electronic product in the modern era is mobile communication devices. Because of the mobility of mobile communication devices and the high demands of consumers on communication devices, more and more people are using mobile communication devices. Among the different kinds of mobile communication devices, mobile phone is a classic example of a mobile communication device.

As technology advances and consumers desires to spend less, there is a trend toward integrating digital image capturer and the mobile communication device. For example, most of the new mobile phones on the market have built-in cameras. Some of them even provide digital camcorder functions. However, those digital image capturers have to resolve the issue of matching the light source frequency when capturing (or sampling) the image.

Generally, when taking a picture in an indoor environment, the light source will be provided by a lighting equipment with the AC power source. The brightness of the light source provided by the AC power lighting equipment generally changes with the change of the AC voltage. When the AC voltage is at its peak, the brightness of the light source is the highest; however, when the AC voltage is at its bottom, the brightness of the light source is the lowest. In other words, the brightness of the light source provided by the AC power lighting equipment alternates between the peak and the bottom. This is so-called strobe. For example, the AC frequency in Taiwan is 60 Hz. Hence, the period of the light source T is 1/F (=1/60=0.017 second). Although a naked eye cannot tell the change of brightness in such short time, when the digital image capture device takes a picture, flickerings in the picture is resulted due to the change of brightness. To mitigate the effect of strobe, the exposure gain needs to be adjusted based on the corresponding external environment to obtain an uniform brightness. Therefore, the digital image capturer has to be adjusted based on the AC voltage frequency (generally 60 Hz or 50 Hz) of the place where the picture is taken.

Currently, there are two solutions to remove the strobe for the digital image capture. The first solution uses a predetermined match circuit based on the target market. However, the predetermined match circuit cannot be adjusted. If the digital image capture device is sold in an area with a 50 Hz AC voltage frequency (e.g., Europe) but the user brings it to the area with a 60 Hz AC voltage frequency (e.g., Taiwan), flick is generated due to the strobe. Another solution provides an option to manually adjust the related parameters and thus has more flexibility. However, manual adjustment is inconvenient to the user. In addition, the user may improperly adjust the parameters, which renders this function useless.

SUMMARY OF INVENTION

An object of the present invention is to provide a method for automatically removing strobe for a digital image capture device so that the user does not have to manually adjust the setting of the digital image capture device in a mobile communication device. Instead, the digital image capture device can automatically adjust the match setting corresponding to the area the picture is taken.

Another object of the present invention is to provide a mobile communication apparatus for automatically removing strobe for a digital image capture device by using a physical device to automatically remove strobe so that the user does not have to manually adjust the setting of the digital image capture device in the mobile communication device. Instead, the digital image capture device can automatically adjust the match setting corresponding to the area the picture is taken.

The present invention provides a method for automatically removing strobe in a digital image capturer of a mobile communication apparatus, comprising: providing a local area data by the mobile communication apparatus, the local area data indicating an area the mobile communication apparatus is located; generating a power frequency data corresponding to the local area data; and setting the digital image capturer based on the power frequency data to remove the strobe.

In one embodiment of the present invention, the method for automatically removing strobe in a digital image capturer of a mobile communication apparatus further comprises: the mobile communication apparatus detecting/communicating a telecommunication service network, the telecommunication service network providing a mobile communication service; and the telecommunication service network sending the local area data to the mobile communication apparatus.

In a preferred embodiment of the present invention, the step of generating the power frequency data corresponding to the local area data includes providing a local area power frequency database, and searching and obtaining the power frequency data based on the local area data and the local area power frequency database.

In a preferred embodiment of the present invention, the step of setting the digital image capturer based on the power frequency data to remove the strobe includes adjusting an exposure gain of an image sensing chip of the digital image capturer based on the power frequency data.

In a preferred embodiment of the present invention, the mobile communication apparatus is a mobile phone. The mobile phone is suitable for a Global System for Mobile Communications (GSM).

In a preferred embodiment of the present invention, the local area data includes a mobile country code (MCC), and the step of generating the power frequency data corresponding to the local area data further includes generating the power frequency data corresponding to the mobile country code.

In a preferred embodiment of the present invention, the local area data includes a mobile network code (MNC), and the step of generating the power frequency data corresponding to the local area data further includes generating the power frequency data corresponding to the mobile network code.

The present invention provides a mobile communication apparatus with a function for automatically removing strobe comprising a wireless communication module for connecting the mobile communication apparatus to a telecommunication service network; a digital image capturer for capturing image; a local area power frequency database module for receiving a local area data and outputting a power frequency data corresponding to the local area data; and a central processing module, coupled to the wireless communication module, the digital image capturer, and the local area power frequency database module; wherein the central processing module obtains the local area data provided by the telecommunication service network via the wireless communication module, searches and obtains the power frequency data based on the local area data and the local area power frequency database, and adjusts an image capture time sequence of the digital image capturer based on the power frequency data to match the local area power frequency.

In a preferred embodiment of the present invention, the mobile communication apparatus is a mobile phone. The mobile phone is suitable for a Global System for Mobile Communications (GSM).

In a preferred embodiment of the present invention, the local area data includes a mobile country code (MCC), and the step of generating the power frequency data corresponding to the local area data further includes generating the power frequency data corresponding to the mobile country code.

In a preferred embodiment of the present invention, the local area data includes a mobile network code (MNC), and the step of generating the power frequency data corresponding to the local area data further includes generating the power frequency data corresponding to the mobile network code.

In a preferred embodiment of the present invention, the digital image capturer is a digital camera.

The present invention obtains the local area information via the mobile communication apparatus and the telecommunication service network. Therefore, the AC voltage frequency of the local area can be easily obtained (e.g., by searching the look-up table) and can be used to automatically adjust the match setting corresponding to the local area where the picture is taken. Hence, the present invention enhances the applicability of integrating a mobile communication apparatus with a built-in digital image camera and the convenience for the user, in which and undue operation on the apparatus by the user is eliminated.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

To better illustrate the present invention, the mobile phone will be used as an embodiment. One skilled in the art can easily apply this present invention to the other mobile communication apparatuses. Further, the built-in digital image capturer in the mobile communication apparatus can be a digital camera. One skilled in the art can also easily apply this present invention to the other digital image capturers.

Figure 1:
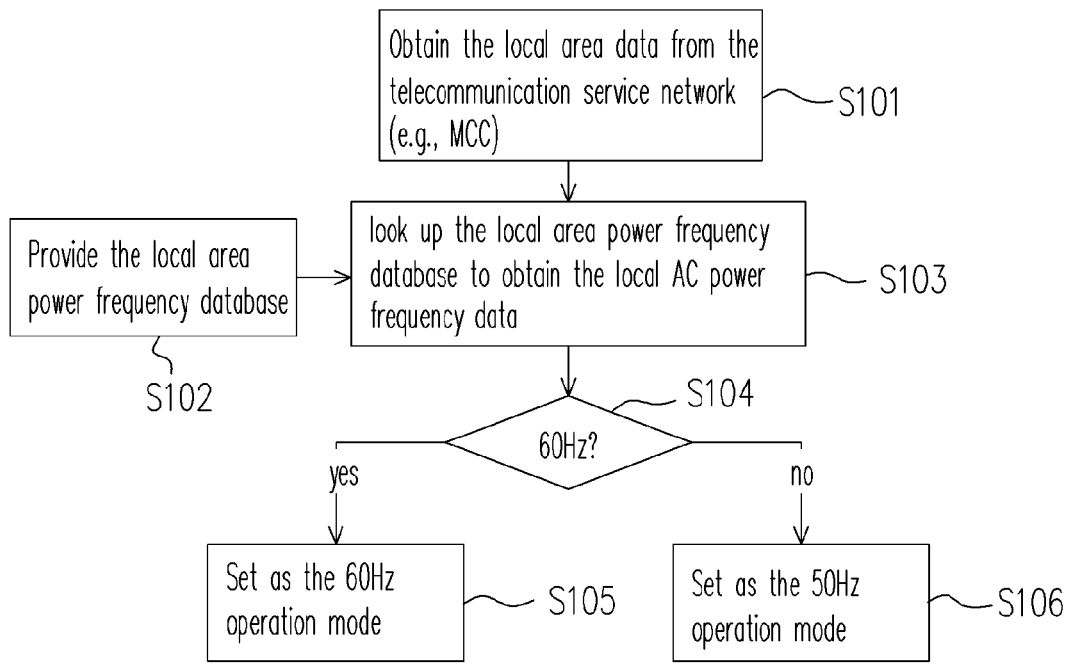
FIG. 1 is the flow chart illustrating the process flow for automatically removing strobe in a digital image capture device of a mobile communication apparatus in accordance with one embodiment of the present invention.

FIG. 1 is the flow chart illustrating the process flow for automatically removing strobe in a digital image capture device of a mobile communication apparatus in accordance with the embodiment of the present invention. Referring to FIG. 1, generally, a mobile phone detects for the telecommunication network service after being turned on. In this embodiment, the mobile phone is suitable for the Global System for Mobile Communication (GSM); the telecommunication service network is, for example, Public Land Mobile Network (PLMN). The telecommunication service network will authenticate the mobile phone to determine whether the mobile phone is authorized. If so, the telecommunication service network will send the local area data to the mobile phone. In this embodiment, the local area data includes the mobile country code (MCC) and the mobile network code (MNC). The MCC and MNC are unique; for example, if the MCC is 466, the code represents Taiwan; and if the MCC is 310, the code represents US. If the MCC is 466 and the MNC is 92, it means that the telecommunication service network is Taiwan Chunghwa Telecom Co. If the MCC is 466 and the MNC is 01, it means that the telecommunication service network is Taiwan Far EasTone Telecom Co.

When the telecommunication service network authenticates the mobile phone and completes the connection, the mobile phone has obtained the local area data (S101). The mobile phone then generates the power frequency data based on the local area data. In this embodiment, the local area power frequency database is provided (S102) and the local AC power frequency data will be obtained by looking up the local area power frequency database (S103). Currently the AC power frequency is 50 Hz or 60 Hz in most countries or areas. For example, the AC power frequency of Taiwan and U.S. is 60 Hz, and the AC power frequency of Europe is 50 Hz. Hence, in step S104, whether the acquired AC power frequency is 60 Hz is determined. If so, the built-in digital camera of the mobile phone will be adjusted to match the operation mode for 60 Hz (S105). Otherwise, the built-in digital camera of the mobile phone is adjusted to match the operation mode for 50 Hz (S106).

Figure 2:
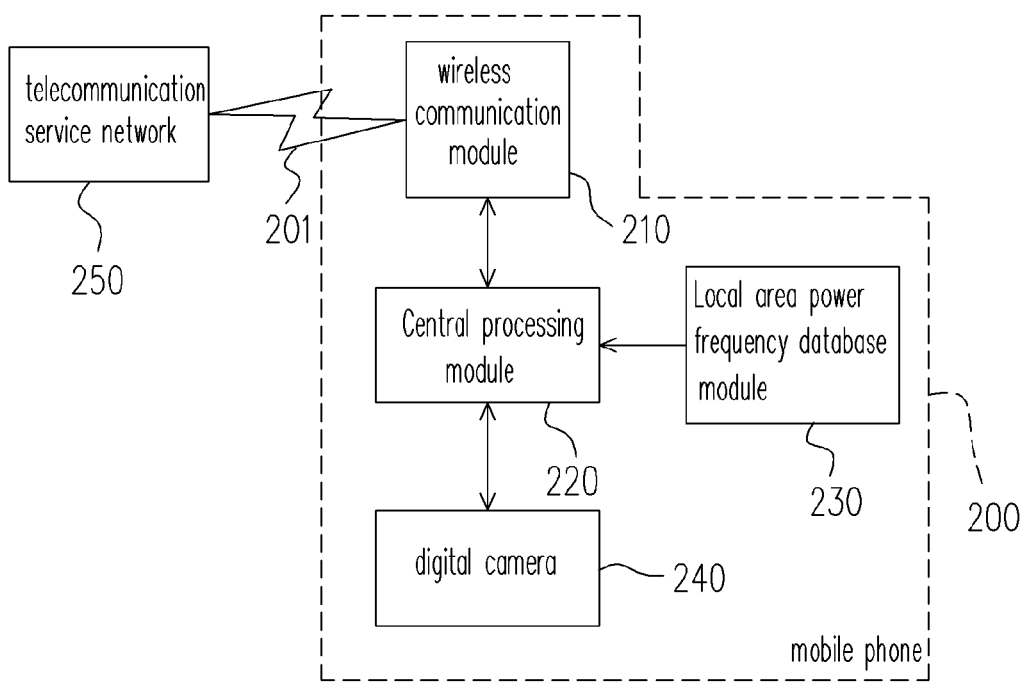
FIG. 2 is the block diagram of a mobile phone with the function of automatically removing strobe in accordance with one embodiment of the present invention.

To further illustrate the present invention, another embodiment of the present invention is proposed as follows. FIG. 2 is the block diagram of a mobile phone with the function of automatically removing strobe in accordance with a preferred embodiment of the present invention. Referring to FIG. 2, the mobile phone 200 includes a wireless communication module 210, a central processing module 220, a local area power frequency database (hereinafter database module) 230, and a digital camera 240. The mobile phone 200 automatically detects the telecommunication network service 250 (e.g., GSM system) after being turned on via the wireless communication module 210 and the wireless signal 201 and communicates with the telecommunication network service 250. The telecommunication network service 250 authenticates the mobile phone to determine whether the mobile phone is authorized. If so, the telecommunication service network 250 will send the local area data to the mobile phone 200. In this embodiment, the local area data includes the mobile country code (MCC) and the mobile network code (MNC). For example, if the MCC is 466, it represents Taiwan; and if the MCC is 310, it represents US. If the MCC is 466 and the MNC is 97, it means that the telecommunication service network is Taiwan Cellular Corp.; and if the MCC is 466 and the MNC is 88, it means that the telecommunication service network is Taiwan KG Telecom Co.

When the telecommunication service network 250 authenticates the mobile phone 200 and completes the connection, the mobile phone 200 has obtained the local area data. In the mobile phone 200, the wireless communication module 210 obtains the local area data from the wireless signal 201 and sends the local area data to the central processing module 220. The central processing module 220 searches and obtains the local AC power frequency corresponding to the local area. The mobile phone is located based on the database module 230 and the local area data. Currently the AC power frequency is 50 Hz or 60 Hz in most countries or areas. For example, the AC power frequency of Taiwan and U.S. is 60 Hz, and the AC power frequency of Europe is 50 Hz. After the central processing module 220 obtains the local AC power frequency from the database module 230, the central processing module 220 determines the AC power frequency match mode of the digital camera 240 and sends the setting signal to the digital camera 240. For example, in Taiwan, the central processing module 220 send the setting signal to the digital camera 240 and the built-in digital camera 240 is adjusted to match the operation mode for 60 Hz. Hence, the user does not have to manually adjust the related parameters. The mobile phone can automatically adjust the related parameters to match the local power frequency based on the area the mobile phone is located, thereby removes the strobe.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A method for automatically removing strobe in a digital image capturer of a mobile communication apparatus comprising:
   providing a local area data by said mobile communication apparatus, said local area data indicating an area where said mobile communication apparatus is located;
   generating a power frequency data corresponding to said local area data; and
   setting said digital image capturer based on said power frequency data to remove said strobe.

2. The method of claim 1, further comprising:
   said mobile communication apparatus detecting/communicating a telecommunication service network, said telecommunication service network providing a mobile communication service; and
   said telecommunication service network sending said local area data to said mobile communication apparatus.

3. The method of claim 1, wherein said step of generating said power frequency data corresponding to said local area data includes:
   providing a local area power frequency database; and
   searching and obtaining said power frequency data based on said local area data and said local area power frequency database.

4. The method of claim 1, wherein said step of setting said digital image capturer based on said power frequency data to remove said strobe comprises adjusting an exposure gain of an image sensing chip of said digital image capturer based on said power frequency data.

5. The method of claim 1, wherein said mobile communication apparatus is a mobile phone.

6. The method of claim 5, wherein said mobile phone is suitable for a Global System for Mobile Communications (GSM).

7. The method of claim 6, wherein said local area data includes a mobile country code (MCC), and said step of generating said power frequency data corresponding to said local area data further includes generating said power frequency data corresponding to said mobile country code.

8. The method of claim 6, wherein said local area data includes a mobile network code (MNC), and said step of generating said power frequency data corresponding to said local area data further includes generating said power frequency data corresponding to said mobile network code.

9. The method of claim 1, wherein said digital image capturer is a digital camera.

10. A mobile communication apparatus with a function for automatically removing strobe comprising:
    a wireless communication module for connecting said mobile communication apparatus to a telecommunication service network;
    a digital image capturer for capturing an image;
    a local area power frequency database module for receiving a local area data and outputting a power frequency data corresponding to said local area data; and
    a central processing module, coupled to said wireless communication module, said digital image capturer, and said local area power frequency database module;
    wherein said central processing module obtains said local area data provided by said telecommunication service network via said wireless communication module, searches and obtains said power frequency data based on said local area data and said local area power frequency database, and adjusts an image capture time sequence of said digital image capturer based on said power frequency data to match said local area power frequency.

11. The apparatus of claim 10, wherein said mobile communication apparatus is a mobile phone.

12. The apparatus of claim 11, wherein said mobile phone is suitable for a Global System for Mobile Communications (GSM).

13. The apparatus of claim 12, wherein said local area data includes a mobile country code (MCC), and said step of generating said power frequency data corresponding to said local area data further includes generating said power frequency data corresponding to said mobile country code.

14. The apparatus of claim 12, wherein said local area data includes a mobile network code (MNC), and said step of generating said power frequency data corresponding to said local area data further includes generating said power frequency data corresponding to said mobile network code.

15. The apparatus of claim 10, wherein said digital image capturer is a digital camera.

* * * * *